United States Patent [19]

Bell

[11] 4,280,074
[45] Jul. 21, 1981

[54] COLLECTOR FOR THERMIONIC ENERGY CONVERTER

[75] Inventor: Ronald L. Bell, Woodside, Calif.
[73] Assignee: Varian Associates, Inc., Palo Alto, Calif.
[21] Appl. No.: 12,687
[22] Filed: Feb. 16, 1979
[51] Int. Cl.³ .............................................. H02N 3/00
[52] U.S. Cl. .................................... 310/306; 136/206
[58] Field of Search ................ 136/206; 310/303, 306

[56] References Cited

U.S. PATENT DOCUMENTS

| | | | |
|---|---|---|---|
| 3,274,403 | 9/1966 | Vore | 310/303 |
| 3,400,015 | 9/1968 | Chapman | 310/306 |
| 3,402,074 | 9/1968 | Chapman et al. | 310/306 X |

Primary Examiner—Leland A. Sebastian
Attorney, Agent, or Firm—Stanley Z. Cole; Norman E. Reitz

[57] ABSTRACT

An improved collector is provided for a thermionic energy converter. The collector comprises a p-type layer of a semiconductor material formed on an n-type layer of a semiconductor material. The p-n junction is maintained in a forward biased condition. The electron affinity of the exposed surface of the p-type layer is effectively lowered to a low level near zero by the presence of a work function lowering activator. The dissipation of energy during collection is reduced by the passage of electrons through the p-type layer in the metastable conduction band state. A significant portion of the electron current remains at the potential of the Fermi level of the n-type layer rather than dropping to the Fermi level of the p-type layer. Less energy is therefore dissipated as heat and a higher net power output is delivered from a thermionic energy converter incorporating the collector.

11 Claims, 11 Drawing Figures

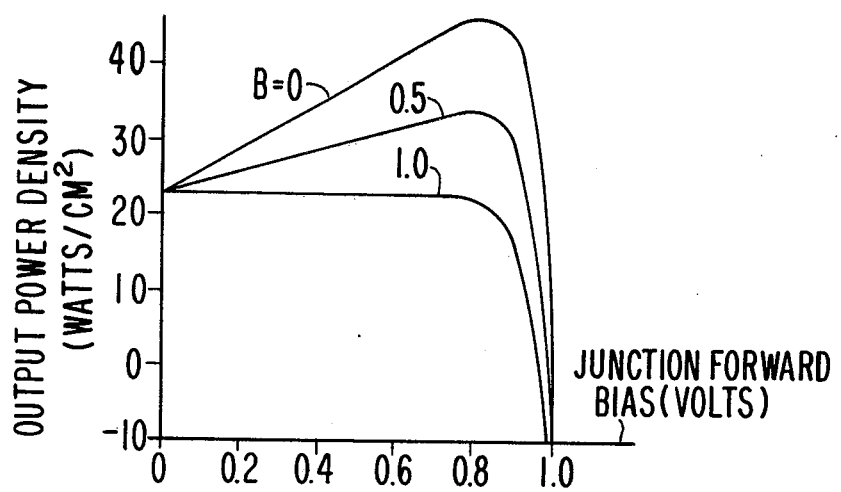
FIG.5
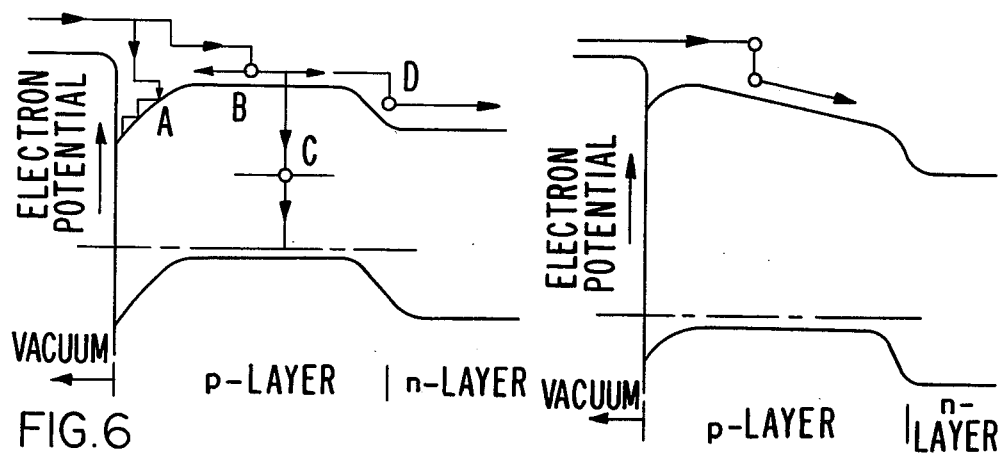
FIG.6
FIG.7
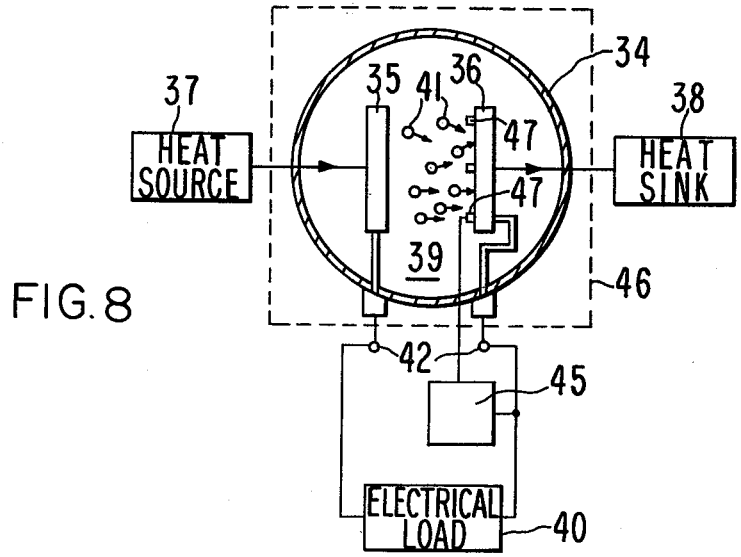
FIG.8

COLLECTOR FOR THERMIONIC ENERGY CONVERTER

BACKGROUND OF THE INVENTION

This invention relates to an improved thermionic energy converter and, more particularly, relates to an improved collector for a thermionic energy converter which incorporates a p-n semiconductor junction.

Thermionic energy converters offer the prospect of converting high temperature heat in the temperature range from about 1100° C. to about 1900° C. directly to electricity. This high temperature heat may be generated by nuclear or concentrated solar sources. In addition, thermionic energy converters offer the prospect of performing a topping conversion cycle in conventional steam electrical power plants. In any of these electrical energy generation applications it is desirable to obtain high conversion efficiencies. Generally, system efficiencies on the order of 10–20% have been obtained by utilizing a high work function emitter in conjunction with a lower work function collector. Clearly, an improvement in a portion of the system, e.g., the collector, will contribute to the overall system efficiency.

Electron transport in thermionic energy converters is typically facilitated either by using a vacuum or by creating an ionized plasma. In the former case the space charge effect is suppressed by utilizing a very close spacing between the emitter and collector. In the latter the negative space charge effect is partially or totally neutralized by positive ions in the vapor; in practice, cesium is often used because it is the most readily ionizable of all stable gases. Thus, in operating thermionic convertors, the collector will likely be exposed either to a vacuum or to an ionized plasma such as a cesium plasma.

Collectors or anodes have been fabricated from metals, from semiconductors, from oxides, from crystalline materials and from polycrystalline materials. See, e.g. I. L. Korobova, et al. "Effect of Collector Material on Characteristics of Thermal Emission Converter", Thermionic Conversion Specialists Meeting, Sept. 1–3, 1975. Eindhoven, Netherlands; D. Lieb, et al., "Thermionic Converter Performance with Oxide Collectors", 12th Intersociety Energy Conference Record, p. 1555; F. Rufeh, et al., "Collector Work Function Measurements", Thermionic Conversion Specialists Conference, 1970, p. 233. These collector materials have their individual inherent work functions which, for a given emitter material, emitter operating temperature, transport medium, and system configuration determine the system efficiency and the voltage which is generated by the converter. Under normal operating conditions a loss of energy is sustained when the electrons enter the collector due to the dissipation of kinetic energy as the impinging electrons fall from their vacuum potential to the Fermi level of the material comprising the collector, an energy dissipation per electron which is approximately equal to the work function of the collector.

It is an object of the present invention to reduce energy dissipation at the collector of a thermionic energy converter.

It is an additional object of the present invention to increase the voltage which can be obtained at the output of a thermionic energy converter.

It is another object of the present invention to use a p-n semiconductor junction in the collector of a thermionic energy generator to reduce the dissipation of electron kinetic energy as electrons impinge upon the collector.

SUMMARY OF THE INVENTION

An improved collector is provided for a thermionic energy converter which comprises a p-type layer of a semiconductor material formed on an n-type layer of a semiconductor. The p-n junction is maintained in a forward biased condition. The electron affinity of the exposed surface of the p-type layer is effectively lowered to a level near zero by the presence of a work function lowering activator. The dissipation of energy during collection is prevented by the passage of electrons through the p-type layer in the metastable conduction band state. A significant portion of the electron current remains at a potential of the Fermi level of the n-type layer rather than dropping to the Fermi level of the p-type layer. Less energy is therefore dissipated as heat and a higher net output power is delivered from a converter incorporating the collector.

BRIEF DESCRIPTION OF THE DRAWINGS

For a more complete understanding of the improved collector of the present invention reference may be had to the accompanying drawings which are incorporated herein by reference and in which:

FIG. 5 is a set of curves of output power density versus junction forward bias for a given fraction of current intercepted by the p-region;

FIG. 6 is a schematic diagram of the loss mechanisms for electrons in the metastable conduction state in the p-layer;

FIG. 7 is a pictorial diagram of a graded bandgap p-region;

FIG. 8 is a pictorial drawing of a thermionic converter incorporating the improved collector of the present invention which illustrates the use of an external bias power supply;

DESCRIPTION OF THE PREFERRED EMBODIMENTS

Theory

The general theory of operation of thermionic energy convertors is well established. See. e.g., E. Blue, et al., "Thermionic Energy Conversion" in *Direct Energy Conversion*, pp 239-332, McGraw Hill (1966); J. Kaye and J. Welsh, eds., *Direct Conversion of Heat to Electricity*, Chps. 1-11, Wiley (1960). Great stress has been placed on selection of system configuration, choice of transport medium, optimization of operating temperature and pressures, and choice of emitter and collector materials. In choosing the collector material, semiconductors, but not semiconductor junctions, have been used.

Figure 1:
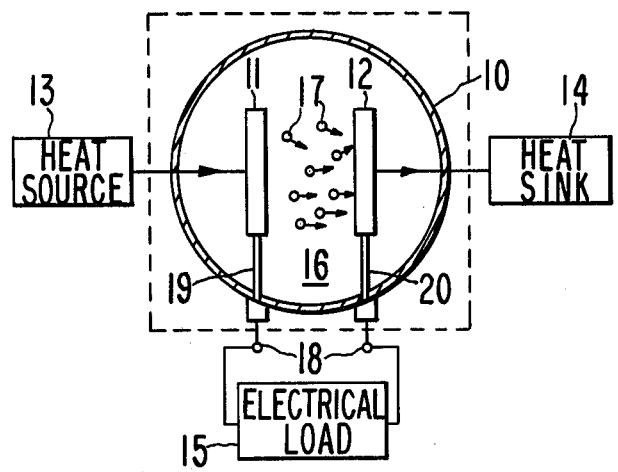
FIG. 1 is a pictorial drawing of a conventional thermionic energy converter.
Figure 3:
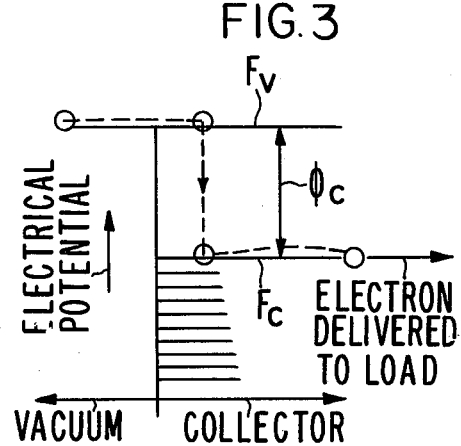
FIG. 3 is a diagram of the potential levels of electrons as they enter a conventional collector.

The theory of conventional collector operation may be understood by reference to FIGS. 1 and 3. An electron enters the collector from the vacuum or vapor with an energy $F_v$ greater than the Fermi level of the material $F_c$ added to the work function of the material $\phi_c$. A portion of this energy is dissipated as waste heat as the electron falls to the Fermi level $F_c$ of the particular collector material. The electron becomes a part of the thermionic converter current and is delivered to the external load 15 at the potential $F_c$. The effective voltage available at the output terminals 18 is thus approximately the difference between the electron potential, $F_e$, in the emitter 11, and this collector level $F_c$ in the collector 12. Since the vacuum level potential is essentially the same adjacent the cathode and anode the effective voltage is the difference between the work functions of the material comprising emitter 11 and the material comprising collector 12 or $\phi_e-\phi_c$. Thus, generally high work function emitters and low work collectors are selected to optimize the voltage delivered within the limitation that low work function collectors must be operated at low temperature to avoid back emission. The formulation $\phi_e-\phi_c$ inherently contains the waste heat factor due to energy dissipation in the collector.

The concept of a zero affinity for electrons in a semiconductor material was first brought forward by J. Scheer, et al. in the Article "GaAs-Cs: A New Type of Photoemitter", Solid-State Communications, V. 3, page 189 (1965). The phenomenon has been widely studied and has lead to practical applications in the area of efficient photoemitters. See R. L. Bell, *Negative Affinity Electron Devices*, Oxford Press (1973), U.S. Pat. No. 3,644,770, entitled "Photoemitter having a p-Type Semiconductive Substrate Overlayed with Cesium and n-Type Cesium Oxide Layers". This phenomenon is adaptable to the collection of electrons, as well as the emission of electrons, as illustrated in the improved collector of the present invention.

Figure 2:
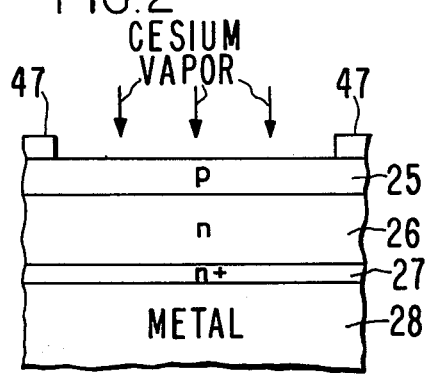
FIG. 2 is a schematic cross section of the improved collector of the present invention.
Figure 4:
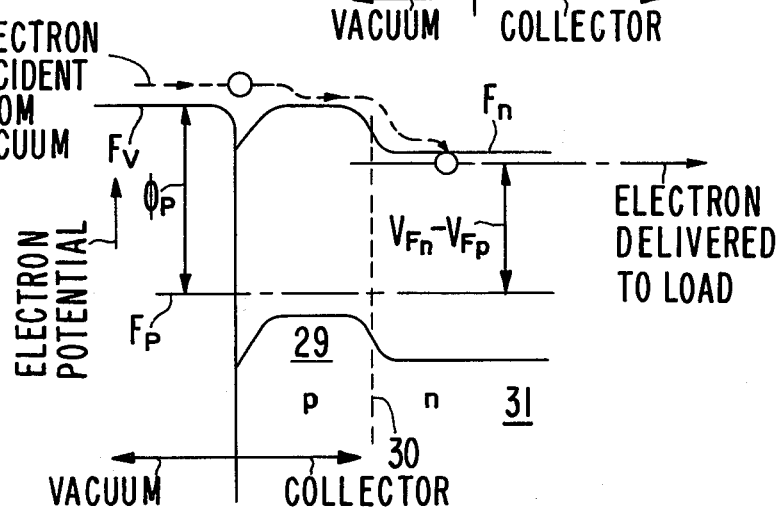
FIG. 4 is a diagram of the potential levels of electrons in the collector of the present invention as they enter the p-type semiconductor and travel across the p-n junction into to the n-type semiconductor.

The improved collector is configured as shown in FIG. 2 as a semiconductor with a heavily doped (concentration preferably greater than $10^{18}/cm^3$) p-type semiconductor layer 25 exposed at the surface to a work function lowering activator, such as a cesium vapor. P-type semiconductor layer 25 overlies n-type layer 26 which in turn overlies heavily doped n+ contact region 27 formed on metal 28. This composite collector functions as shown in FIG. 4. An electron from the vacuum enters with an energy $F_v$. It enters into a metastable conduction band state within the p-type material. In this state it has a lifetime of about $10^{-6}$ to $10^{-9}$ second which is long enough to permit transport across the p-n junction. The loss of energy is equivalent to the effective affinity of the exposed p-type surface; this effective affinity may be very low. While in this metastable state it diffuses to the p-n junction and enters the n-type region. Since the junction is forward biased (by means to be described) the Fermi level on the n side of the junction, $F_n$, is appreciably higher than the Fermi level, $F_p$, on the p side of the junction. Thus, the electron falls only to the higher level, given numerically by $F_p$ plus the forward bias and a portion of the potential energy of the electron is saved; this savings is equal to the junction forward bias or $V_{Fn}-V_{Fp}$. Thus, in the formula for voltage output of the converter $\phi_E-\phi_c$ we have an additive voltage of the order of the realizable forward bias; in other words the effective work function of the collector has been reduced. It should be noted that the actual affinity of the cathode need not be zero or negative. A slightly positive affinity for the collector material can still effectively reduce the affinity to a tolerable level.

The forward bias of the junction is produced in one embodiment by an external power supply 45, as shown in FIG. 8, and in another embodiment by the photovoltaic generation of current in the collector itself. The amount of current introduced by external power supply 45 or by photovoltaic current generation is small as compared to the working current produced by thermionic emission even when losses at the p-n junction are considered.

Structure

The structure of a conventional thermionic energy converter is shown in the pictorial drawing of FIG. 1. An emitter 11 typically fabricated from a refractory metal material, and a collector 12 are placed in juxtaposition within a sealed enclosure 10 fabricated from ceramic or glass and metal materials. A heat source 13 communicates high temperature heat on the order of 1100° C. to 1900° C. to the emitter 11 to produce electron emission. Electrons 17 are transported through vacuum or plasma 16 to the exposed surface of collector 12. Waste heat produced by the impinging electrons is communicated to heat sink 14. Feed throughs 19 and 20 connect the emitter 11 and the collector 12, respectively, to the output terminals 18. An electrical load 15 can be connected, at will, across terminals 18.

A thermionic converter configuration suitable for use with the improved collector of the present invention is shown in FIG. 8. In the embodiment shown an auxiliary power supply 45 is connected across the p-n junction to provide it with a forward bias. One side of the supply is connected in common with the collector current feed through. The other side of the supply is connected to a grid fabricated on the exposed p-type semiconductor surface of the collector 36. This grid is constructed in the same manner as topside contacts for concentrator solar cells and will intercept less than 10% of the incident thermionic current. This current is represented by electrons 46 and is transported through plasma or vacuum 39 from emitter 35.

The composite collector is fabricated from a semiconductor material such as gallium arsenide whose cesiated surface will have a low effective affinity. The p-type region will be as thin as 0.25 μm which is much less than one electron diffusion length of 2 μm so that recombination does not take precedence over diffusion to the p-n junction. It may also be desirable to select materials such as AlGaAs for the n region so that the n-region has a much wider bandgap than the p-region, preventing the injection of holes into the n-region under the forward bias operating conditions. This can be accomplished, for example, by fabricating the n-region from a GaAlAs alloy and the p-region of GaAs.

In another embodiment the improved collector is tailored to be photosensitive to the infrared emission from the emitter so that the photocurrent serves to forward bias the junction; consequently, no auxiliary power supply is required. The structure of the system is similar to the conventional thermionic converter of FIG. 1 except that the collector is a p-n semiconductor junction described herein. The collector can be tailored to the temperature radiation emission spectrum of the emitter by constructing it of materials of appropriate lower or higher bandgaps which can be brought close to the zero affinity condition by addition of activators such as Cs and oxygen (see Bell, loc. cit.) and which can be made both p-type and n-type.

The collector of the present invention, as shown in FIG. 2, has a first highly doped p-type layer 25, for example, GaAs with an impurity concentration between 0.3 and $3 \times 10^{19}/cm^3$ formed on a second n-type layer 26, for example, AlGaAs with an impurity concentration between 0.3 and $3 \times 10^{18}/cm^3$. In practice, an n+ semiconductor layer 27 may be formed on the rearward side of the n-type layer 25 in order to provide an effective ohmic contact to the conductive metal contact 28 which may be fabricated from any suitable conductive material.

Operation

In FIG. 8, emitter 35 in thermionic energy converter 46 will typically be operated at a temperature of 1100° C. to 1900° C. The ejected electrons 41 will travel through a cesium vapor 39 between emitter 35 and collector 36. Substantially all of the electrons will enter the p-type semiconductor material. (See FIG. 2) As they enter p-type layer 25 they necessarily enter the conduction band as shown in FIG. 4. They move rapidly to the p-n junction 30 and pass into n-type layer 31 subject to the losses discussed subsequently. Due to the forward bias across the p-n junction the energy drop of the electrons as they cross the junction is not from the vacuum potential, $F_v$, to the Fermi level, $F_p$, of the p-type material. Rather, it is from the level of the conduction band of the p-type material to the Fermi level on the n side, which is algebraically equal to the cumulative level of the Fermi level in the p-type material and the forward bias. As long as this bias is maintained the electrons delivered to the load remain at this higher additive level. In effect a small biasing current controls and prevents losses in the thermionic current in an analogous manner to the operation of an npn transistor. If a load is impressed across terminals 42, then the electrons will move through the load 40 and will return to the emitter 35.

Loss mechanisms are present as the electrons traverse the p-type layer 29 shown in FIG. 4, and approach the p-n junction 30 for transport into the n-type layer (D). As shown in FIG. 6 these mechanisms include trapping in the surface depletion layer after energy loss to optical phonons (A), back diffusion and emission (B), and recombination with holes in the valence band (C). In one embodiment back diffusion is prevented by providing a bandgap gradient or doping gradient in the p-type layer which helps to drive the electrons towards the p-n junction. As seen in FIG. 7, the electrons will roll down the potential gradient to reach the p-n junction. From thermodynamic principles, some electrons will be re-emitted from the collector owing to its low effective work function, and its finite temperature. In order to minimize the tendency to back emission the ratio of collector temperature, $T_c$ to effective collector work function, $T_c/\phi_c$, is preferably less than 700° K./ev. The other loss mechanisms are of second order concern at the high current values compatible with the improved collector of the present invention.

The improvement in system operating efficiency due to the collector of the present invention will be produced by the current which flows through the p-n junction less any current supplied to maintain the forward bias. The set of curves in FIG. 5 illustrates the net output power density as a function of junction forward bias voltage when the forward bias is supplied by an external circuit as shown in FIG. 8. The curves are drawn for a series of values for B, the fraction of the current incident on a p-type GaAs layer which fails to pass across the p-n junction and be delivered to the load at the higher voltage. For B=0 all the current passes across the p-n junction and the output power rises steadily for biases up to about 0.8 volts; beyond about 0.8 volts the junction begins to draw substantial forward current. At this point the maxiimum power output in a typical case is almost doubled. Even for higher values of B there is a substantial contribution to the net output power density in this case where the bias is supplied by external supply 45. As B increases a greater portion of the total current is handled by the topside metallization in a manner akin to concentrator solar cells.

In an alternate embodiment the forward bias on the p-n junction 30 of FIG. 4 is maintained by the generation of photovoltaic current due, for example, to the infrared emissions of the emitter. In this embodiment the topside contact 47 is not required since the bias is internally generated. The selection of the material for the first p-type layer and for the second n-type layer can be made in accordance with well established bandgap concepts to produce sufficient photovoltaic current to maintain the forward bias under operating conditions. See H. J. Hovel, *Solar Cells*, v. 11 of Semiconductors and Semimetals series, Academic Press (1975). Generally, it is desirable to have well-matched heterojunctions or high quality homojunctions for the p-n semiconductor junction to not impair photovoltaic action. The first p-type layer and the second n-type layer will necessarily be selected from elemental semiconductors such as silicon or germanium or from the binary, ternary and quaternary alloys of aluminum, gallium, indium, phosphorous, arsenic and antimony which have the zinc-blende crystal structure. Doping levels will range from $10^{17}$ to $10^{20}/cm^3$ in accordance with accepted principles of optimizing the functioning of photovoltaic p-n junctions.

Figure 9:
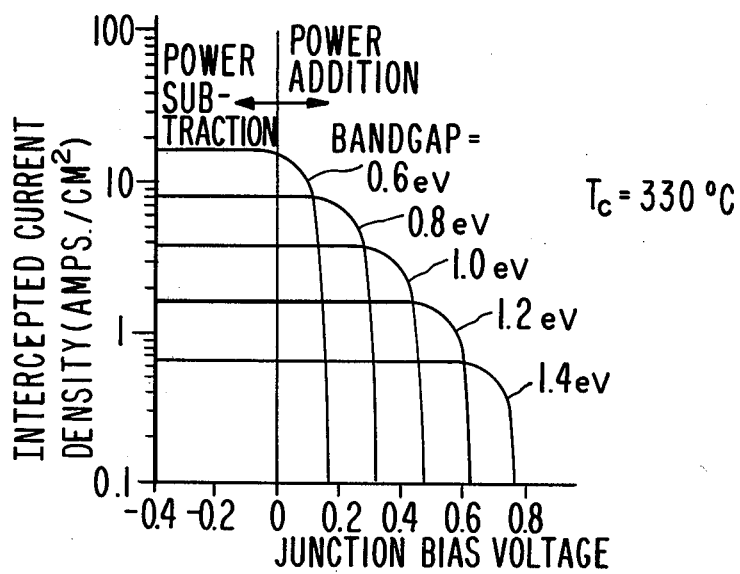
FIG. 9 is a set of curves of thermionic current density versus junction bias voltage for materials of increasing bandgap when the collector is operating in the "photovoltaic mode" and its temperature is about 330° C.
Figure 10:
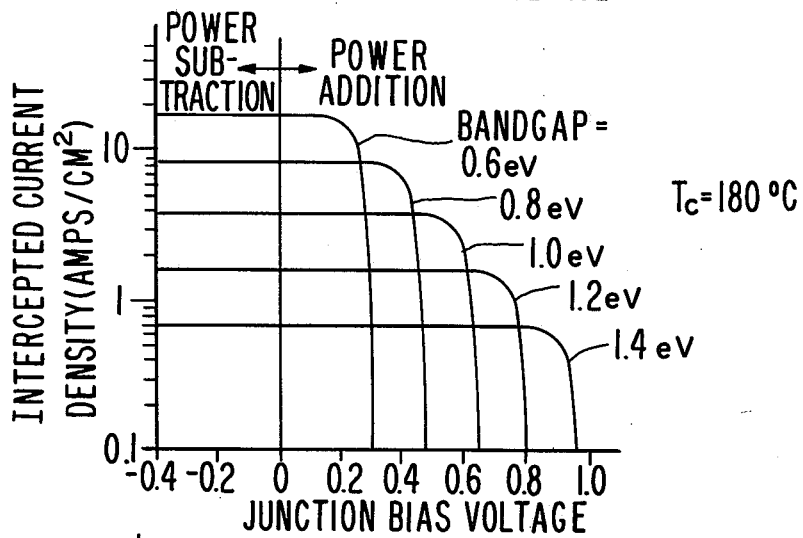
FIG. 10 is a set of curves of thermionic current density versus junction bias voltage for materials of increasing bandgap when the collector is operating in the "photovoltaic mode" and its temperature is about 180° C.
Figure 11:
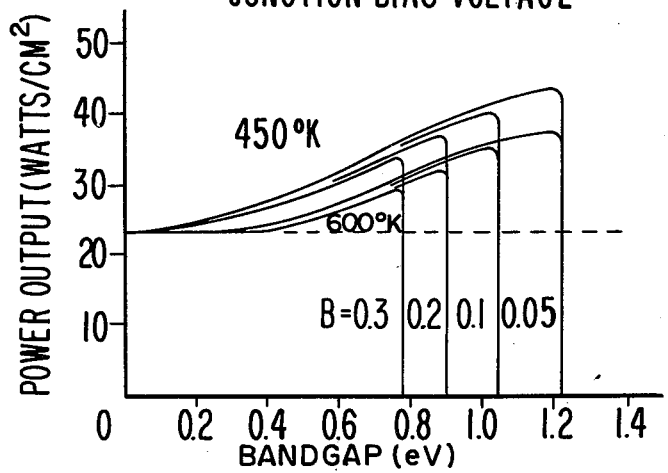
FIG. 11 is a set of curves of power output versus bandgap for the two collector operating temperatures of FIGS. 9 and 10 and for values of B, the fraction of thermionic current which does not reach the n-type layer.

FIGS. 9 and 10 contain sets of curves of thermionic current density versus voltage for materials of increasing bandgap. Both figures are based on an emitter operating temperature of about 1700° C. while FIG. 9 is based on a collector temperature of about 330° C. and FIG. 10 is based on a collector temperature of about 180° C. In both cases, operation at any forward bias increases the output voltage by essentially the amount of the forward bias. As the bandgap is lowered, the semiconductor absorbs more and more of the incident infrared radiation, and is able to generate higher and higher short-circuit photovoltaic currents, but forward bias voltage is progressively reduced. The bandgap of the material should be selected to optimize power output. FIG. 11 shows a comparison of power output versus bandgap for the two collector operating temperatures of FIGS. 9 and 10 and for four values of B, the fraction of the thermionic current intercepted by the first p-type layer and which therefore does not reach the second n-type layer. The thermionic current is assumed to be 30 amps/square centimeter and the emitter temperature to be 1700° C. Thus, the loss mechanisms discussed previously should be carefully checked in this embodiment. Once B is known, the minimum useful bandgap may be determined.

In a typical application the transport medium will be a cesium plasma. The cesium plasma functions as a work-function lowering surface treatment for the exposed surface of the p-type semiconductor material; to perform this function it may actually form a blended cesium and cesium oxide layer on the surface. See, *Bell*, op. cit., pp. 33–44; M. Burt, et al., "Theory of Work-Function of Cesium Suboxides and Cesium Films", J. Physics C, V. 11, p. 961 (1978). It also serves to neutralize the electron space charge adjacent the collector surface.

While the invention has been described in connection with specific embodiments thereof, it will be understood that it is capable of further modifications, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

I claim:

1. In a thermionic energy converter having within a sealed enclosure, an emitter for emitting electrons upon receipt of heat from a heat source, an electron transport medium, a collector for collecting electrons and adapted to communicate waste heat to a heat sink, and means for conducting electrical current between said emitter and a first terminal exterior to said enclosure, and means for conducting electrical current between said collector and a second terminal exterior to said enclosure the improvement comprising:

said collector comprising a first layer of a p-type semiconductor material formed on a second layer of an n-type semiconductor material, said first and second layers forming a p-n junction and having a forward bias therebetween, one side of said p-type layer forming the exposed surface of said collector and said n-type layer being in electrical contact with said means to conduct electrical current between said collector and said second terminal.

2. The improved thermionic energy converter of claim 1 wherein said first layer of semiconductor material is gallium arsenide and said second layer of semiconductor material is an alloy of gallium, aluminum and arsenic.

3. The improved thermionic energy converter of claim 1 wherein said first layer of semiconductor material is an alloy of gallium, aluminum and arsenic and said second layer is gallium arsenide.

4. The improved thermionic energy converter of claim 3 wherein said first layer of p-type semiconductor material has a doping level greater than $10^{18}/cm^3$.

5. The improved thermionic energy converter of claim 1 in combination with a work function lowering activator adjacent said one side of said p-type layer.

6. The improved thermionic energy converter of claim 5 in combination with a conductive grid formed on said exposed surface of said p-type semiconductor material and a bias power supply connected, respectively, to said grid and to said second layer of an n-type semiconductor for obtaining said forward bias.

7. The improved thermionic energy converter of claim 6 wherein said work function lowering activator is a mixture of cesium and cesium oxide.

8. The improved thermionic energy converter of claim 5 wherein the materials comprising said first semiconductor layer and said second semiconductor layer are selected so that they are sensitive to the infrared emission from said emitter, so that the resultant photovoltaic current produces said forward bias.

9. The improved thermionic energy converter of claim 8 wherein said work function lowering activator is a mixture of cesium and cesium oxide.

10. The improved thermionic energy converter of claim 9 wherein said first semiconductor layer and said second semiconductor layer are selected to allow maximum forward bias to be obtained.

11. The improved thermionic energy converter of claim 1 wherein said p-n junction comprises a heterojunction.

* * * * *